US005438829A

United States Patent [19]
Kubota et al.

[11] Patent Number: 5,438,829
[45] Date of Patent: Aug. 8, 1995

[54] AIR COMPRESSION SYSTEM HAVING TWO SEPARATE COMPRESSED AIR ACCUMULATORS

[75] Inventors: Toshifumi Kubota; Mitsuhiro Sunaoshi, both of Katsuta, Japan

[73] Assignee: Hitachi Koki Co., Ltd., Tokyo, Japan

[21] Appl. No.: 59,368

[22] Filed: May 12, 1993

[30] Foreign Application Priority Data

Jun. 5, 1992 [JP] Japan ................................ 4-145709
Mar. 10, 1993 [JP] Japan ................................ 5-149488

[51] Int. Cl.[6] ................................ F16D 31/02
[52] U.S. Cl. ................................ 60/410; 60/416; 91/5
[58] Field of Search ................ 60/407, 408, 410, 415, 60/416, 418; 91/5

[56] References Cited

U.S. PATENT DOCUMENTS

| | | | |
|---|---|---|---|
| 134,083 | 12/1872 | McKay | 91/5 |
| 320,482 | 6/1885 | Leavitt | 60/407 |
| 488,865 | 12/1892 | Bodley | 60/408 |
| 2,244,384 | 6/1941 | Bissinger | 60/410 |
| 3,469,400 | 9/1969 | Oikawa et al. | 60/415 |

*Primary Examiner*—F. Daniel Lopez
*Attorney, Agent, or Firm*—Sughrue, Mion, Zinn, Macpeak & Seas

[57] ABSTRACT

An air compression system for supplying a compressed air into a pneumatically operated tool. The system includes an air compressor and air accumulator connected to the compressor and having a first accumulator and a second accumulators separate therefrom. A relief valve is connected between the first and second accumulators for allowing the compressed air to flow from the first accumulator to the second accumulator when a pressure of the compressed air accumulated in the first accumulator increases to a predetermined pressure. A check valve is provided between the first and second accumulators and in parallel to the relief valve for allowing the compressed air to flow from the second accumulator to the first accumulator. The accumulator is connected to the pneumatically operated too. If the tool requires small amount of compressed air for operation, the compressed air supply into the first accumulator is only necessary to reduce recharging period.

2 Claims, 2 Drawing Sheets

AIR COMPRESSION SYSTEM HAVING TWO SEPARATE COMPRESSED AIR ACCUMULATORS

BACKGROUND OF THE INVENTION

The present invention relates to an air compression system, and more particularly to a type thereof in which compressed air produced by an air compressor is accumulated in a compressed air accumulator, the compressed air being supplied to a pneumatically operated tool such as a pneumatically driven nail gun.

A conventional air compression system is provided with a compressed air accumulator. The accumulator must have a large internal volume to maintain a stable supply of compressed air. This requirement increases when the pneumatically operated tool used with the air compression system consumes large volumes of compressed air. With such a tool, an internal volume as large as possible is required in order to reduce pressure drop.

On the other hand, if a pneumatically operated tool which does not consume a large volume of compressed air is operated, a compressed air accumulator having a large internal volume is undesirable. This is because a prolonged time is needed for increasing pneumatic pressure to a desired compression level after energization of the air compression system. This waiting or dead time reduces operating or working efficiency of the pneumatically operated tool. In other words, the larger internal volume of the compressed air accumulator requires longer period for providing a desirable air compression level.

SUMMARY OF THE INVENTION

It is therefore, an object of the present invention to provide an improved air compression system capable of promptly providing a desired air compression level in a compressed air accumulator whose internal air pressure is initially approximately zero.

This and other objects of the invention will be attained by providing an air compression system for supplying a compressed air into a pneumatically operated tool, the system including an air compressor having an outlet end and an air accumulator connected to the outlet end of the air compressor, and the improvement comprising the air accumulator comprising a first accumulator and a second accumulator separate therefrom, and means for changing air accumulation to the second accumulator when a pressure of the compressed air accumulated in the first accumulator increases to a predetermined pressure.

DETAILED DESCRIPTION OF THE PREFERRED EMBODIMENTS

Figure 1:
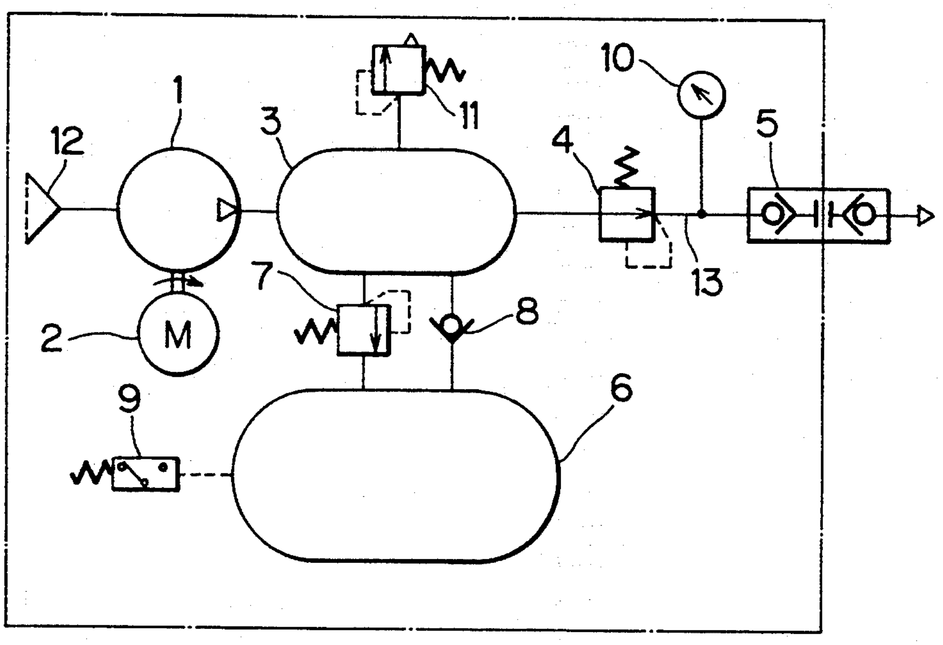
FIG. 1 is a schematic diagram showing a pneumatic circuit of an air compression system according to a first embodiment of the present invention.

An air compression system according to a first embodiment of the present invention will be described with reference to FIG. 1. A compressor 1 has an inlet side connected to an air intake filter 12. The compressor 1 is connected to a drive motor 2 for intaking and compressing air upon energization of the motor 2. The motor 2 is connected to a pressure switch 9.

A compressed air accumulator is connected to an outlet side of the compressor 1. The accumulator includes a first accumulator 3 and a second accumulator 6. The compressor 1 is directly connected to the first accumulator 3. The first accumulator 3 is connected to a pressure reducing valve 4 which is connected to a quick disconnect coupling 5 via a main air passage 13. The quick disconnect coupling 5 is connected to a pneumatically operated tool (not shown). Further, a pressure gauge 10 is connected to the main air passage 13 and between the pressure reducing valve 4 and the coupling 5 for indicating level of the compressed air flowing through the air passage 13. Moreover, a safety valve 11 is connected to the first accumulator 3 for releasing the compressed air out of the accumulator 3 when its pressure exceeds a predetermined level.

The first accumulator 3 is connected to the second accumulator 6. The internal volume of the second accumulator 6 is greater than that of the first accumulator 3. The second accumulator 6 is connected in series to the first accumulator 3 with respect to an outlet of the compressor 1. A relief valve 7 and a check valve 8 are provided in parallel between the first and second accumulators 3 and 6. The relief valve 7 is adapted for allowing compressed air to flow from the first accumulator 3 to the second accumulator 6 where the compressed air accumulates, when pressure in the first accumulator 3 exceeds a predetermined level. Further, the relief valve 7 prevents the compressed air in the second accumulator 6 from flowing into the first accumulator 3. The check valve 8 is adapted for supplying compressed air from the second accumulator 6 to the first accumulator 3 when successive supply of the compressed air from the first accumulator 3 to the pneumatically operated tool causes the pressure level in the first accumulator 3 to drop below that in the second accumulator 6.

The pressure switch 9 is connected to the second accumulator 6. The pressure switch 9 is adapted for energizing the drive motor 2 to re-start the compressor 1 when the pressure level in the second accumulator 6 drops below a predetermined level, and for deenergizing the drive motor 2 to stop the compressor 1 when the pressure level in the second accumulator 6 exceeds the predetermined level. Incidentally, the safety valve 11 opens at a pressure level higher than that at which the relief valve 7 opens.

Operation of the air compression system will be described. Assuming that the pressure level in the first and second accumulators 3 and 6 before start of the system is almost zero. The drive motor 2 is energized and the compressed air is generated in the compressor 1. The compressed air is introduced into the first accumulator 3. When the pneumatic pressure in the first accumulator 3 exceeds the predetermined level preset in the relief valve 7, the air flows into the second accumulator 6 through the relief valve 7. The pressure level in the second accumulator 6 will continue to increase until it exceeds a predetermined level. The pressure switch 9 is then activated to stop the drive motor 2 and generation of compressed air. At this time, the pressure levels in the first and second accumulators 3 and 6 are equal to each other.

Compressed air in the first accumulator 3 is supplied to the pneumatically operated tool through the coupling 5. When the pressure in the first accumulator 3 drops below that of the second accumulator 6, the compressed air in the second accumulator 6 flows into the first accumulator 3 through the check valve 8. Pressure equilibrium is therefor maintained between the first and the second accumulators 3 and 6. In other words, the combination of the first and second accumulators 3 and 6 serves as a single accumulator whose internal volume is equal to the total internal volumes of the first and second accumulators 3 and 6. If operation of the pneumatically operated tool further consumes compressed air, the pressure switch 9 is again activated for energizing the drive motor 2 to re-start the compressor 1.

If the air compression system is connected to a pneumatically operated tool which consumes a great amount of the compressed air, the operation of the pneumatically operated tool is suspended until the pressure level in both the first and second accumulators 3 and 6 exceeds a predetermined level. In this case, the combination of the first and the second accumulators 3 and 6 serves as a single accumulator whose internal volume is equal to the total internal volume of the first and the second accumulators 3 and 6. On the other hand, if the air compression system is connected to a pneumatically operated tool which consumes a reduced amount of the compressed air, the operation of the pneumatically operated tool can be started when the pressure level only in the first accumulator 3 reaches the predetermined level regardless of the pressure level in the second accumulator 6. Accordingly, the latter tool can be repeatedly operated with only a brief waiting time between operations.

Figure 2:
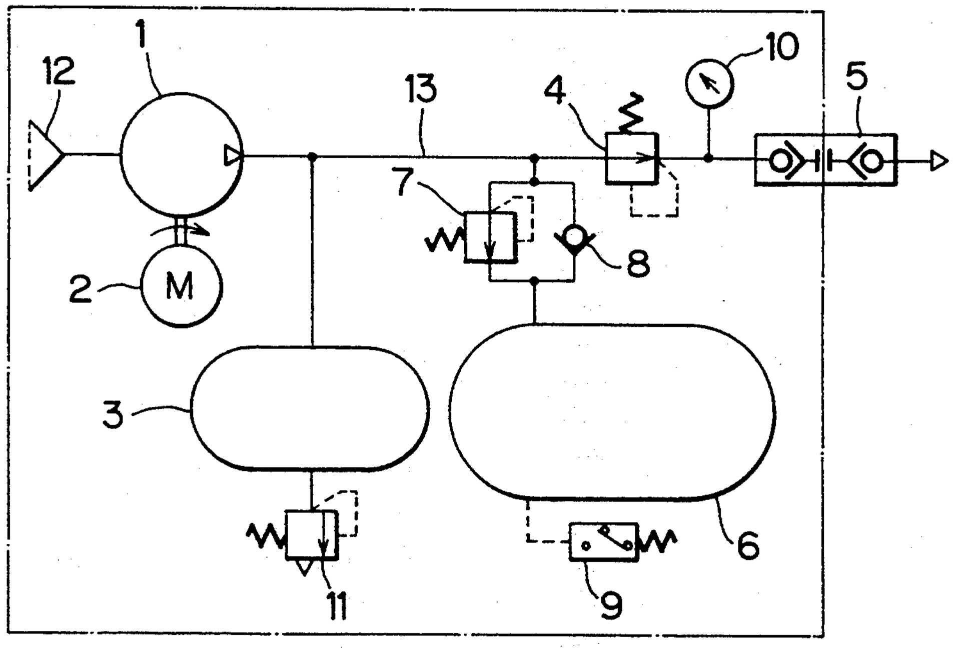
FIG. 2 is a schematic diagram showing a pneumatic circuit of an air compression system according to a second embodiment of the present invention.

An air compression system according to a second embodiment of the present invention will next be described with reference to FIG. 2, wherein like parts and components are designated by the same reference numerals as those shown in FIG. 1. In the second embodiment, the first and second accumulator 3 and 6 are not directly connected to each other, but each of the accumulators 3 and 6 is connected to the main passage 13. In other words, the first and second accumulators 3 and 6 are connected in parallel with respect to the outlet end of the compressor 1.

Operation in the second embodiment is almost the same as that of the first embodiment except that when the pressure level of the first accumulator 3 drops to the predetermined level because the compressed air is supplied from the first accumulator 3 to the tool, the compressed air from the second accumulator 6 is directly supplied to the pneumatically operated tool without passing through the first accumulator 3. The second embodiment is advantageous over the first embodiment in that the positioning of each accumulator is more flexible because direct fluid communication between the accumulators is unnecessary.

Figure 3:
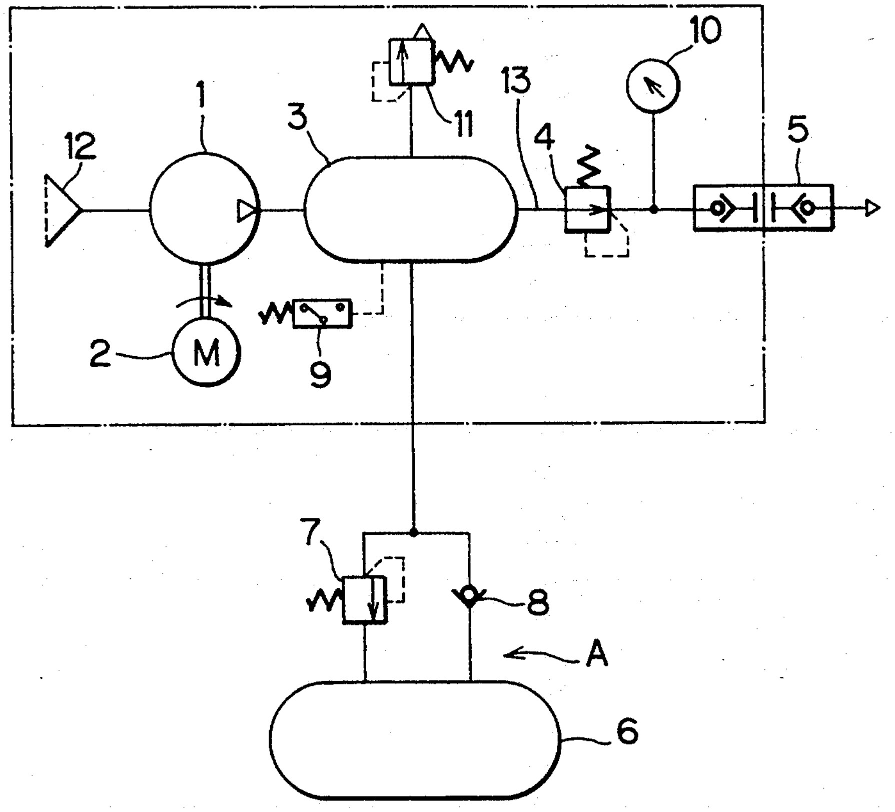
FIG. 3 is a schematic diagram showing a pneumatic circuit of an air compression system according to a third embodiment of the present invention.

An air compression system according to a third embodiment of the present invention is shown in FIG. 3. In the third embodiment, the aforementioned second accumulator 6 serves as an auxiliary accumulator which may be connected to a conventional air compression system marked by a dotted chain line. In other words, a combination of the accumulator 6, the relief valve 7 and the check valve 8 serves as an auxiliary compressed air accumulation unit A connectable to the first accumulator 3. In the third embodiment, the pressure switch 9 is connected to the first accumulator 3.

Figure 4:
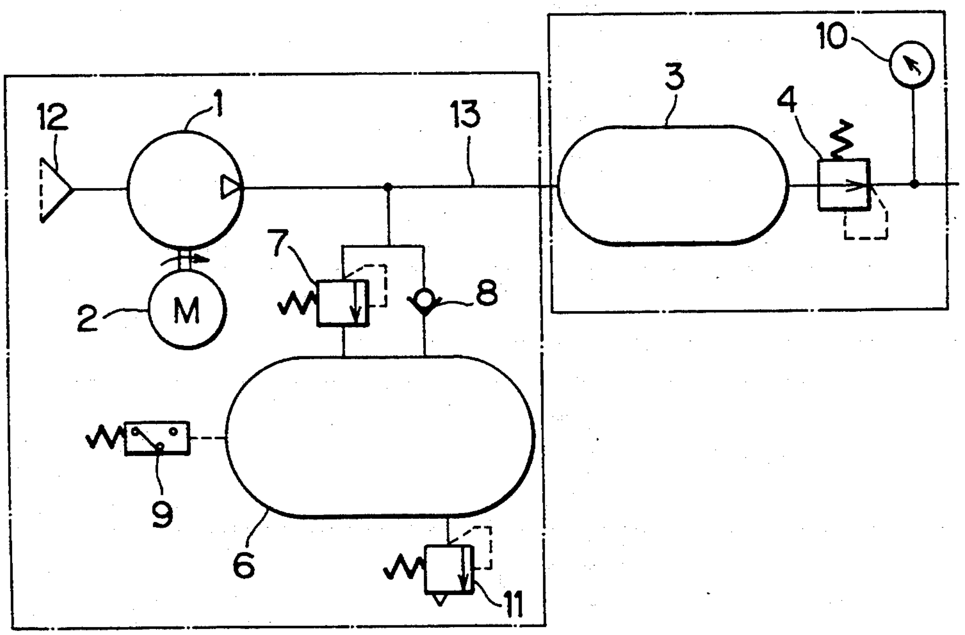
FIG. 4 is a schematic diagram showing a pneumatic circuit of an air compression system according to a fourth embodiment of the present invention.

An air compression system according to a fourth embodiment of the present invention is shown in FIG. 4. The forth embodiment performs operation in the same manner as that of the foregoing embodiments. In the fourth embodiment the first accumulator 3 is nearer the pneumatically operated tool than is the second accumulator 6, and the safety valve 11 is connected to the second accumulator 6. Since the first accumulator 3 is positioned close to the pneumatically operated tool, high speed of compressed air flowing to the tool can be provided, and flow resistance can be minimized. Therefore, working efficiency of the tool can be enhanced.

In the foregoing embodiments, the first and second air accumulators 3 and 6 are provided independently of each other. However, a single air accumulator is available as long as a partitioning wall is provided therein for separating the accumulator into two chambers which function respectively as the first and second air accumulators. Further, a counter balance valve is available instead of the separate relief valve 7 and the check valve 8.

In view of the foregoing, in the air compression system according to the present invention, supply of the compressed air into the second air accumulator is suspended until the pneumatic pressure in the first air accumulator reaches, the predetermined level. Therefore, predetermined pressure level required for operating the pneumatically operated tool can be promptly provided in the accumulator. This is advantageous when operating a tool which consumes small amount of compressed air because recharging period can be reduced. Further, tools which consume larger amounts of compressed air can also be operated by the air compression system according to the present invention because complete accumulation of compressed air in both first and second air accumulators is equivalent to accumulation of compressed air in a large volume of accumulator.

While the invention has been described in detail and with reference to specific embodiment thereof, it would be apparent to those skilled in the art that various changes and modifications may be made therein without departing from the spirit and scope of the invention.

What is claimed is;

1. An air compression system for supplying a compressed air into a pneumatically operated tool, the system including an air compressor having an outlet end and an air accumulator connected to the outlet end of the air compressor, and the improvement comprising:

the air accumulator comprising a first accumulator and a second accumulator separate therefrom, the first and second accumulators being connected in series with respect to the outlet end of the compressor, and the first accumulator being connected to the pneumatically operated tool;

means for changing air accumulation to the second accumulator when a pressure of the compressed air accumulated in the first accumulator increases to a predetermined pressure, the changing means comprising a relief valve connected between the first and second accumulators for allowing the compressed air in the first accumulator to flow into the second accumulator when the pressure level in the first accumulator reaches the predetermined pressure;

a check valve connected between the first and second accumulators for allowing the compressed air accumulated in the second accumulator into the first accumulator when the pressure level in the first accumulator is lower than that in the second accumulator; and a pressure switch connected to the first accumulator for detecting a pressure level and energizing the compressor when the pressure level in the first accumulator drops below a predetermined level, the second accumulator, the relief valve, and the check valve being in a unit connectable to the first accumulator.

2. The air compression system as claimed in claim 1, wherein the second accumulator has an internal volume greater than that of the first accumulator.

* * * * *